(12) United States Patent
Yang et al.

(10) Patent No.: US 11,317,354 B2
(45) Date of Patent: Apr. 26, 2022

(54) UPLINK PREEMPTION INDICATION

(71) Applicant: QUALCOMM Incorporated, San Diego, CA (US)

(72) Inventors: Wei Yang, San Diego, CA (US); Jing Jiang, San Diego, CA (US); Seyedkianoush Hosseini, San Diego, CA (US); Chih-Ping Li, San Diego, CA (US); Wanshi Chen, San Diego, CA (US); Amir Aminzadeh Gohari, Sunnyvale, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/678,955

(22) Filed: Nov. 8, 2019

(65) Prior Publication Data

US 2020/0154363 A1  May 14, 2020

Related U.S. Application Data

(60) Provisional application No. 62/759,992, filed on Nov. 12, 2018.

(51) Int. Cl.
*H04W 52/14* (2009.01)
*H04W 8/24* (2009.01)
(Continued)

(52) U.S. Cl.
CPC ........... *H04W 52/146* (2013.01); *H04L 5/001* (2013.01); *H04W 8/24* (2013.01); *H04W 24/08* (2013.01); *H04W 76/27* (2018.02)

(58) Field of Classification Search
CPC ..... H04W 52/146; H04W 76/27; H04W 8/24; H04W 24/08; H04L 5/001
(Continued)

(56) References Cited

U.S. PATENT DOCUMENTS 9,642,114 B2 *  5/2017  Fong ............... H04L 1/0026
10,375,649 B2 *  8/2019  Seo ............... H04W 52/42
(Continued)

FOREIGN PATENT DOCUMENTS

EP          3783966 A1 *  2/2021  ............ H04W 52/10
WO    WO-2020064552 A1 *  4/2020  .......... H04W 52/281

OTHER PUBLICATIONS

International Search Report and Written Opinion—PCT/US2019/060658—ISA/EPO—dated Mar. 23, 2020.
(Continued)

*Primary Examiner* — Mong-Thuy T Tran
(74) *Attorney, Agent, or Firm* — Patterson+ Sheridan, L.L.P.

(57) ABSTRACT

Certain aspects of the present disclosure provide techniques for uplink preemption indication. A method for wireless communication by a user equipment (UE) includes receiving at least one ULPI from a base station (BS) indicating, for each of a plurality of sets of uplink resources, a power level the UE can use for one or more uplink transmissions. The UE can determine one or more power levels indicated by the ULPI for resources allocated for the UE for uplink transmission. The allocated resources may include multiple of the sets of uplink resources. The UE can select the power level to use for uplink transmission using the allocated resources based, at least in part, on the determination. The UE sends or drops the one or more uplink transmissions according to the ULPI. A time duration of the plurality of sets of uplink resources can be longer than a configured ULPI monitoring periodicity.

30 Claims, 15 Drawing Sheets

(51) Int. Cl.
*H04W 76/27* (2018.01)
*H04W 24/08* (2009.01)
*H04L 5/00* (2006.01)

(58) Field of Classification Search
USPC .................................................. 370/329, 328
See application file for complete search history.

(56) References Cited

U.S. PATENT DOCUMENTS

| | | | | |
|---|---|---|---|---|
| 2007/0042784 | A1* | 2/2007 | Anderson | H04B 17/24 455/450 |
| 2016/0302209 | A1* | 10/2016 | Behravan | H04L 1/0003 |
| 2017/0215149 | A1* | 7/2017 | Zhang | H04W 52/146 |
| 2018/0027589 | A1* | 1/2018 | Yang | H04L 25/00 370/329 |
| 2018/0035459 | A1* | 2/2018 | Islam | H04W 74/04 |
| 2019/0098612 | A1* | 3/2019 | Babaei | H04W 72/0446 |
| 2019/0306801 | A1* | 10/2019 | Zhou | H04W 52/04 |
| 2019/0306848 | A1* | 10/2019 | Zhou | H04W 72/08 |
| 2019/0342874 | A1* | 11/2019 | Davydov | H04L 5/0094 |
| 2020/0029316 | A1* | 1/2020 | Zhou | H04W 74/0833 |
| 2020/0146045 | A1* | 5/2020 | Loehr | H04L 5/0048 |
| 2020/0281012 | A1* | 9/2020 | Behravan | H04W 72/1284 |
| 2020/0288463 | A1* | 9/2020 | Lee | H04W 72/1242 |
| 2021/0176713 | A1 | 6/2021 | Yang et al. | |

OTHER PUBLICATIONS

Apple Inc: "Discussion on Handling of UL Multiplexing of Transmissions with Different Reliability", 3GPP TSG RAN WG1 Meeting #92m 3GPP Draft; R1-1802289, 3GPP, Mobile Competence Centre; 650, Rou, vol. RAN WG1, No. Athens, Greece; Feb. 26, 2018-Mar. 2, 2018, Feb. 17, 2018, XP051397819, 5 Pages, http://www.3gpp.org/ftp/tsg%5Fran/WG1%5FRL1/TSGR1%5F92/Docs.

Qualcomm Incorporated: "eMBB and URLLC Dynamic Multiplexing and Preemtion Indication on the Uplink", 3GPP TSG RAN WG1 Meeting #92, 3GPP Draft; R1-1802854 EMBB and URLLC Dynamic Multiplexing And Preemption Indication on The Uplink, 3GPP, Movile Competence Centre ; 650, Route Des Lucoiles ; F-06, vol. RAN WG1, No. Athens, Greece; Feb. 26, 2018-Mar. 2, 2018, XP051398267, (8 Pages) URL:http://www.3gpp.org/ftp/tsg%5Fran/WG1%5FRL1/TSGR1%5F92/Docs.

* cited by examiner

UPLINK PREEMPTION INDICATION

CROSS-REFERENCE TO RELATED APPLICATION(S)

This application claims benefit of and priority to U.S. Provisional Application No. 62/759,992, filed Nov. 12, 2018, which is hereby assigned to the assignee hereof and hereby expressly incorporated by reference herein in its entirety as if fully set forth below and for all applicable purposes.

TECHNICAL FIELD

Aspects of the present disclosure relate to wireless communications, and more particularly, to techniques involving signaling preemption information (e.g., uplink preemption indication) and power-control related information (e.g., power boosting and/or backoff). Certain embodiments can enable and provide flexible communication scenarios and/or efficient control signaling (e.g., reduced uplink and/or downlink control overhead) to help bring about communications with low latencies and high reliability.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. NR (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY OF SOME EXAMPLES

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving at least one uplink preemption indication (ULPI) from a base station (BS). The ULPI can indicate a power level the UE can use for one or more uplink transmissions. The indication can be for one or more uplink resource sets. In some scenarios, the ULPI can indicate a power level for each of a plurality of sets of uplink resources. The method generally includes sending or dropping the one or more uplink transmissions according to the ULPI.

Certain aspects provide a method for wireless communication by a UE. The method generally includes receiving a first ULPI in a first ULPI monitoring period from a BS indicating, for a first plurality of sets of uplink resources, whether the resources are preempted. A time duration of the first plurality of sets of uplink resources is longer than a configured ULPI monitoring periodicity for the UE. The method generally includes sending or dropping one or more uplink transmissions according to the ULPI.

Certain aspects provide a method for wireless communication by a BS. The method generally includes transmitting at least one ULPI to a UE indicating, for each of a plurality of sets of uplink resources, a power level the UE can use for transmission on that set.

Certain aspects provide a method for wireless communication by a BS. The method generally includes transmitting a first ULPI to a UE in a first ULPI monitoring period indicating, for a first plurality of sets of uplink resources, whether the resources are preempted. A time duration of the first plurality of sets of uplink resources is longer than a configured ULPI monitoring periodicity for the UE.

Certain aspects provide an apparatus for wireless communication. The apparatus generally includes means for receiving at least one ULPI from another apparatus indicating a power level the apparatus can use for one or more uplink transmissions. The ULPI can indicate a power level the apparatus can use for one or more uplink transmissions. The indication can be for one or more uplink resource sets. In some scenarios, the ULPI can indicate a power level for each of a plurality of sets of uplink resources. The apparatus generally includes means for sending or dropping the one or more uplink transmissions according to the ULPI.

Certain aspects provide an apparatus for wireless communication. The apparatus generally includes means for receiving a first ULPI in a first ULPI monitoring period from another apparatus indicating, for a first plurality of sets of uplink resources, whether the resources are preempted. A time duration of the first plurality of sets of uplink resources is longer than a configured ULPI monitoring periodicity for the apparatus. The apparatus generally includes means for sending or dropping one or more uplink transmissions according to the ULPI.

Certain aspects provide an apparatus for wireless communication. The apparatus generally includes means for transmitting at least one ULPI to another apparatus indicating a power level the other apparatus can use for transmission. The ULPI can indicate a power level the other apparatus can use for one or more uplink transmissions. The indication can be for one or more uplink resource sets. In some scenarios, the ULPI can indicate a power level for each of a plurality of sets of uplink resources.

Certain aspects provide an apparatus for wireless communication. The apparatus generally includes means for transmitting a first ULPI to another apparatus in a first ULPI monitoring period indicating, for a first plurality of sets of uplink resources, whether the resources are preempted. A time duration of the first plurality of sets of uplink resources is longer than a configured ULPI monitoring periodicity for the other apparatus.

Certain aspects provide an apparatus for wireless communication. The apparatus generally includes a memory and at least one processor coupled with the memory. The at least one processor is generally configured to receive at least one ULPI from another apparatus indicating a power level the apparatus can use for one or more uplink transmissions. The ULPI can indicate a power level the apparatus can use for one or more uplink transmissions. The indication can be for one or more uplink resource sets. In some scenarios, the ULPI can indicate a power level for each of a plurality of sets of uplink resources. The at least one processor is generally configured to send or drop the one or more uplink transmissions according to the ULPI.

Certain aspects provide an apparatus for wireless communication. The apparatus generally includes a memory and at least one processor coupled with the memory. The at least one processor is generally configured to receive a first ULPI in a first ULPI monitoring period from another apparatus indicating, for a first plurality of sets of uplink resources, whether the resources are preempted. A time duration of the first plurality of sets of uplink resources is longer than a configured ULPI monitoring periodicity for the apparatus. The at least one processor is generally configured to send or drop one or more uplink transmissions according to the ULPI.

Certain aspects provide an apparatus for wireless communication. The apparatus generally includes a memory and at least one processor coupled with the memory. The at least one processor is generally configured to transmit at least one ULPI to another apparatus indicating a power level other apparatus can use for transmission. The ULPI can indicate a power level the other apparatus can use for one or more uplink transmissions. The indication can be for one or more uplink resource sets. In some scenarios, the ULPI can indicate a power level for each of a plurality of sets of uplink resources.

Certain aspects provide an apparatus for wireless communication. The apparatus generally includes a memory and at least one processor coupled with the memory. The at least one processor is generally configured to transmit a first ULPI to another apparatus in a first ULPI monitoring period indicating, for a first plurality of sets of uplink resources, whether the resources are preempted. A time duration of the first plurality of sets of uplink resources is longer than a configured ULPI monitoring periodicity for the other apparatus.

Certain aspects provide a computer readable medium storing computer executable code thereon for wireless communication. The computer readable medium generally includes code for receiving at least one ULPI from a BS indicating a power level a UE can use for one or more uplink transmissions. The ULPI can indicate a power level the UE can use for one or more uplink transmissions. The indication can be for one or more uplink resource sets. In some scenarios, the ULPI can indicate a power level for each of a plurality of sets of uplink resources. The computer readable medium generally includes code for sending or dropping the one or more uplink transmissions according to the ULPI.

Certain aspects provide a computer readable medium storing computer executable code thereon for wireless communication. The computer readable medium generally includes code for receiving a first ULPI in a first ULPI monitoring period from a BS indicating, for a first plurality of sets of uplink resources, whether the resources are preempted. A time duration of the first plurality of sets of uplink resources is longer than a configured ULPI monitoring periodicity for a UE. The computer readable medium generally includes code for sending or dropping one or more uplink transmissions according to the ULPI.

Certain aspects provide a computer readable medium storing computer executable code thereon for wireless communication. The computer readable medium generally includes code for transmitting at least one ULPI to a UE indicating a power level the UE can use for transmission on that set of uplink resources. The ULPI can indicate a power level the UE can use for one or more uplink transmissions. The indication can be for one or more uplink resource sets. In some scenarios, the ULPI can indicate a power level for each of a plurality of sets of uplink resources.

Certain aspects provide a computer readable medium storing computer executable code thereon for wireless communication. The computer readable medium generally includes code for transmitting a first ULPI to a UE in a first ULPI monitoring period indicating, for a first plurality of sets of uplink resources, whether the resources are preempted. A time duration of the first plurality of sets of uplink resources is longer than a configured ULPI monitoring periodicity for the apparatus.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
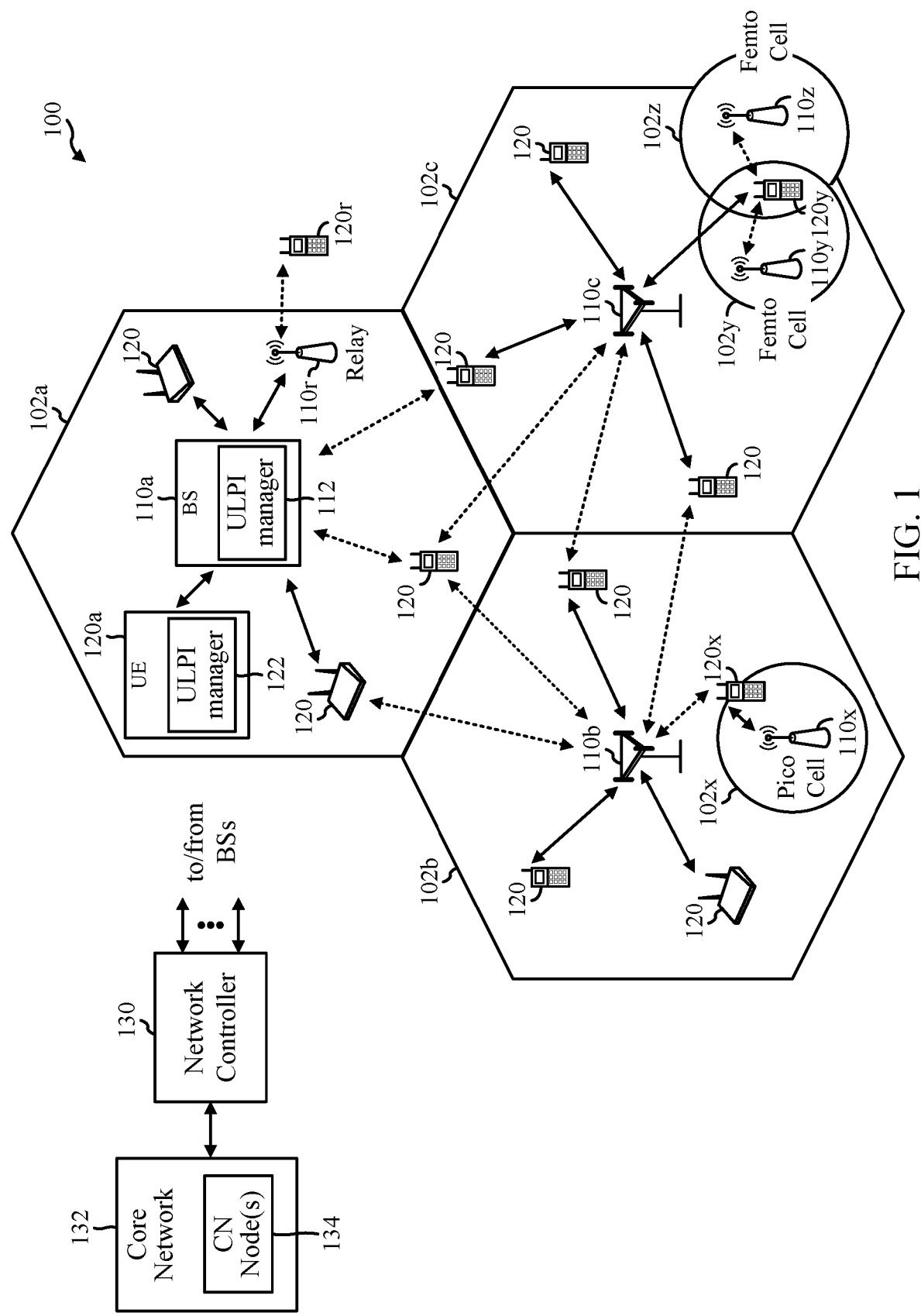
FIG. 1 is a block diagram conceptually illustrating an example telecommunications system, in accordance with certain aspects of the present disclosure.

Aspects of the present disclosure provide apparatus, methods, processing systems, and computer readable mediums for uplink preemption indication (ULPI). Aspects provide ULPI with a power dimension indication. Aspects provide ULPI that indicates preemption for resources over duration longer than a ULPI monitoring periodicity, for ULPIs indicating overlapping resources, and for handling conflicting ULPIs.

The following description provides examples of ULPI, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

In general, any number of wireless networks may be deployed in a given geographic area. Each wireless network may support a particular radio access technology (RAT) and may operate on one or more frequencies. A RAT may also be referred to as a radio technology, an air interface, etc. Each frequency may support a single RAT in a given geographic area in order to avoid interference between wireless networks of different RATs. In some cases, NR or 5G RAT networks may be deployed.

New radio access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR may utilize orthogonal frequency division multiplexing (OFDM) on the downlink and/or downlink, and/or may utilize single-carrier frequency division multiplexing (SC-FDM) on the uplink. NR may utilize a cyclic prefix (CP). NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. NR may support a base spacing of the subcarriers of 15 kHz and other subcarrier spacing (SCS) may be defined with respect to the base SCS (e.g., 30 kHz, 60 kHz, 120 kHz, 240 kHz, etc). The minimum resource allocation (e.g., a resource block (RB)) may be 12 consecutive subcarriers. The system bandwidth may also be partitioned into subbands. For example, a subband may cover multiple RBs. In NR, a subframe is 1 ms, but the basic TTI is referred to as a slot. A subframe contains a variable number of slots (e.g., 1, 2, 4, 8, 16, . . . slots) depending on the SCS. The symbol, slot, and CP lengths scale with the SCS Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces. As shown in FIG. 1, the core network 132 may include one or more CN nodes 134.

As illustrated in FIG. 1, the wireless communication network 100 may include a number of BSs 110a-z (each also individually referred to herein as BS 110 or collectively as BSs 110) and other network entities. A BS 110 may be provide communication coverage for a particular geographic area, sometimes referred to as a cell, which may be stationary or may move according to the location of a mobile BS 110. BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110. The network controller 130 may communicate with the BSs 110 via a backhaul.

The BSs 110 communicate with UEs 120a-y (each also individually referred to herein as UE 120 or collectively as UEs 120) in the wireless communication network 100. Each UE may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120 to facilitate communication between devices.

According to certain aspects, the BSs 110 and UEs 120 may be configured for uplink preemption. The wireless communication network 100 may be a 5G NR network. As shown in FIG. 1, the BS 110a includes a ULPI manager 112 and the UE 120a includes a ULPI manager 122. The ULPI manager 112 may be configured to send, and the ULPI manager 122 to receive, at least one ULPI. The ULPI indicates, for each of a plurality of sets of uplink resources, a power level the UE 120a can use for one or more uplink transmissions, such as eMBB. The ULPI manager 122 may be configured to send or drop, and the ULPI manager 112 to monitor or not monitor, the one or more uplink transmissions according to the ULPI.

Figure 2:
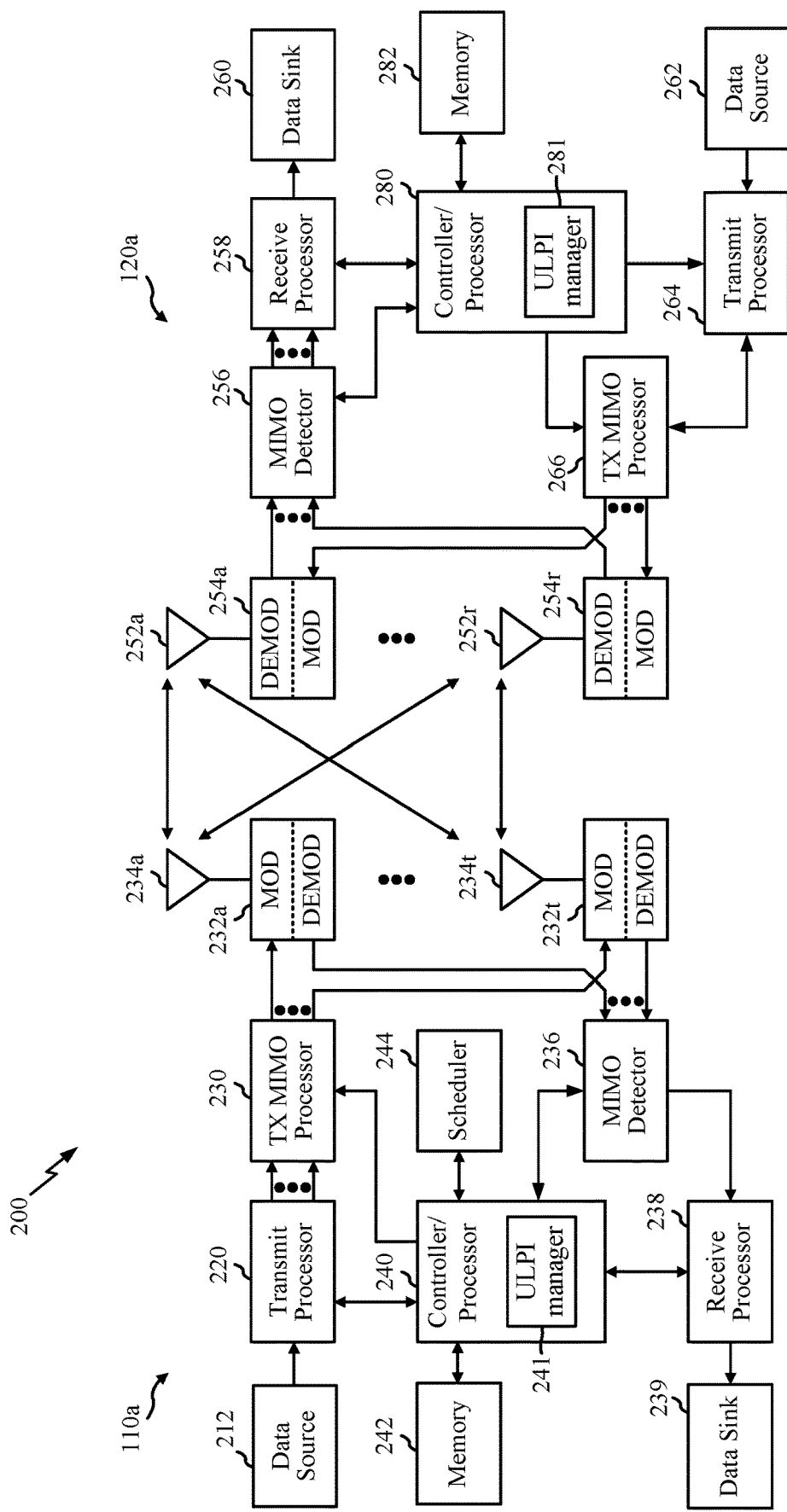
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a through 254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120a and/or antennas 234, processors 220, 230, 238, and/or controller/processor 240 of the BS 110a and/or other modules may be used to perform the various techniques and methods described herein for the ULPI. As shown in FIG. 2, the controller/processor 280 has an ULPI manager 281 and the controller/processor 240 has an ULPI manager 241. The memories 242 and 282 may store data and program codes for BS 110a and UE 120a, respectively. A scheduler 244 may schedule UEs for data transmission on the downlink and/or uplink.

Aspects of the disclosure relate generally to uplink preemption. As mentioned above, 5G NR can support services with different and/or varying reliability and latency requirements (e.g., such as eMBB and URLLC). The ULPI features discussed herein can help bring about such features. ULPI may also be referred to as an uplink cancellation indication (or ULCI).

In some cases, the network (e.g., the BS 110*a*) multiplexes users (e.g., UEs 120) with different services (e.g., eMBB and URLLC) in the same time-frequency resources, such as to improve efficiency (e.g., better spectrum utilization). URLLC, having stricter latency targets, may be more urgent and may, therefore, be scheduled over resources allocated to eMBB.

The BS can transmit a downlink preemption indication (DLPI) to the UEs to indicate that downlink resources allocated for one service (e.g., eMBB) are preempted for transmissions for another service (e.g., URLLC). For example, the BS may signal a DLPI to a UE, scheduled to receive an eMBB transmission, to indicate that the downlink resources for the eMBB transmission are reallocated for a URLLC transmission, by that UE or a different UE.

In order to improve URLLC services, the BS may signal to a UE to suspend ongoing uplink transmissions of a first service (e.g., eMBB) when a second service (e.g., URLLC) transmissions are scheduled. This preemption of resources may help to reduce interference with the URLLC transmissions, for example, to help achieve the strict reliability targets for URLLC. For example, the BS may transmit an indication to a UE, scheduled to send an eMBB transmission, that the uplink resources for the eMBB transmission are reallocated for a URLLC transmission by a different UE. That is, the eMBB UE is indicated to preempt (e.g., cancel or drop) its uplink transmission on the corresponding resources indicated as "preempt" in the indication. This may be referred to as an uplink preemption indication (ULPI) or uplink cancellation indication.

Figure 3:
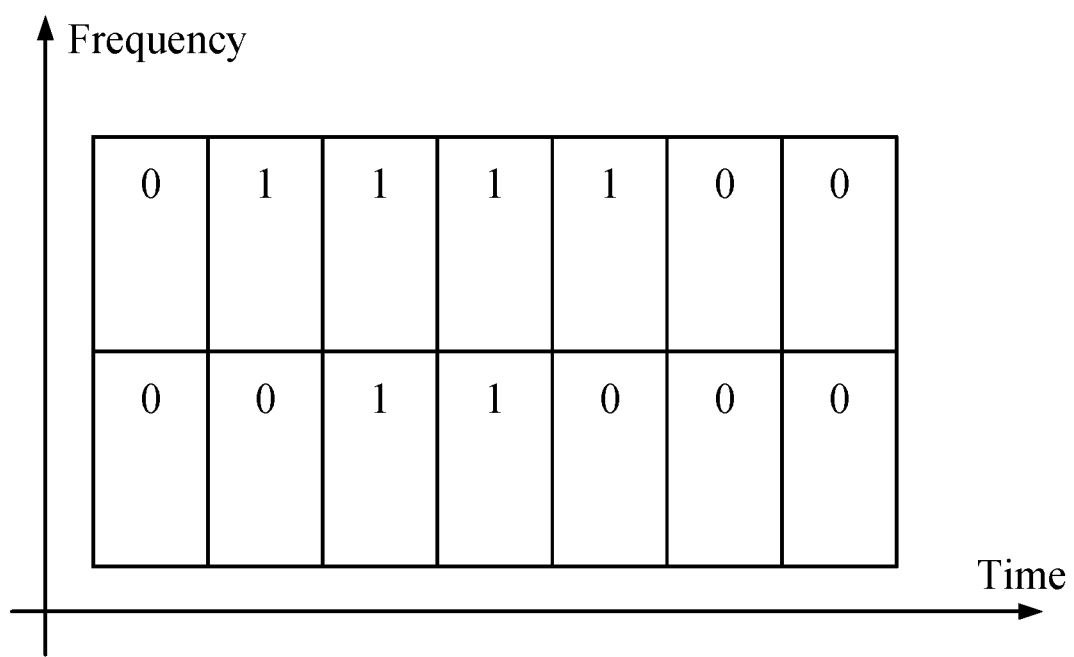
FIG. 3 is an example uplink preemption indicator (ULPI), in accordance with certain aspects of the present disclosure.

FIG. 3 is an example ULPI. An ULPI may indicate preemption for a set of resources. In the example shown in FIG. 3, time and frequency resources are divided into 14 parts, 2 parts in frequency and 7 parts in time. In this example, 14 bits can be used to indicate whether a corresponding frequency-time part is pre-empted or not (e.g., 0 may indicate not preempted and a 1 may indicate preempted). The numbers of bits and the granuarality if the resources indicated by each bit may vary. In the example shown in FIG. 3, the total time-domain resources indicated by the ULPI is equal to the ULPI monitoring periodicity. Thus, if the ULPI monitoring periodicity is 2 slots (e.g., 28 symbols), then using the 14 bits, and with two frequency parts, each bit corresponds to a 4 symbol time part.

Example ULPI

Aspects of the present disclosure provide apparatus, methods, processing systems, and computer readable mediums for uplink preemption indication (ULPI). According to certain aspects, the ULPI can indicate a power dimension indication. According to certain aspects, the ULPI indicates preemption for resources over a duration longer than a ULPI monitoring periodicity and/or multiple ULPIs in different ULPI monitoring occasions may indicate preemption information for overlapping resources. Aspects provide techniques and apparatus for handling conflicting ULPI indications.

According to certain aspects, instead of, or in addition to, indicating whether resources are preempted or not preempted, the ULPI may include a power dimension to indicate a power level or power back-off the UE can use for the indicated resources. For example, the ULPI may indicate a power back-off for a user equipment (UE) to apply to an uplink transmission for a first service (e.g., enhanced mobile broadband (eMBB)), for example, in order to reduce interference to an uplink transmission by another UE for a second service (e.g., ultra-reliable low-latency communication (URLLC)).

Figure 4:
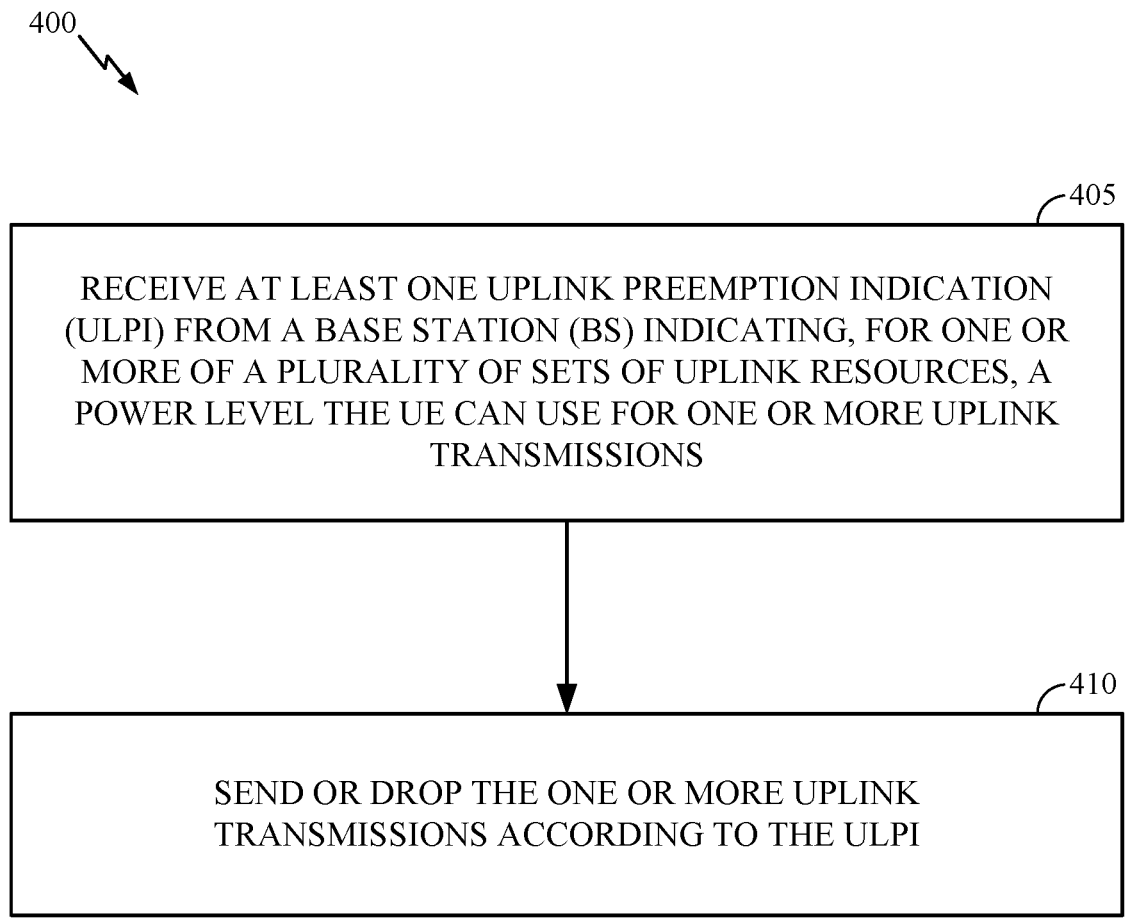
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120*a* in the wireless communication network 100). Operations 400 may be implemented as software components that are executed and run on one or more processors (e.g., processor 280 of FIG. 2). Further, the transmission and reception of signals by the UE in operations 400 may be enabled, for example, by one or more antennas (e.g., antennas 234 of FIG. 2). In certain aspects, the transmission and/or reception of signals by the UE may be implemented via a bus interface of one or more processors (e.g., processor 280) obtaining and/or outputting signals.

The operations 400 may begin, at 405, by receiving at least one ULPI from a BS indicating, for one or more of a plurality of sets of uplink resources, a power level the UE can use for one or more uplink transmissions. In some scenarios, the ULPI can indicate a power level for each of a plurality of sets of uplink resources. The one or more set of resources may include a plurality of RBs in one or more symbols.

Figure 5:
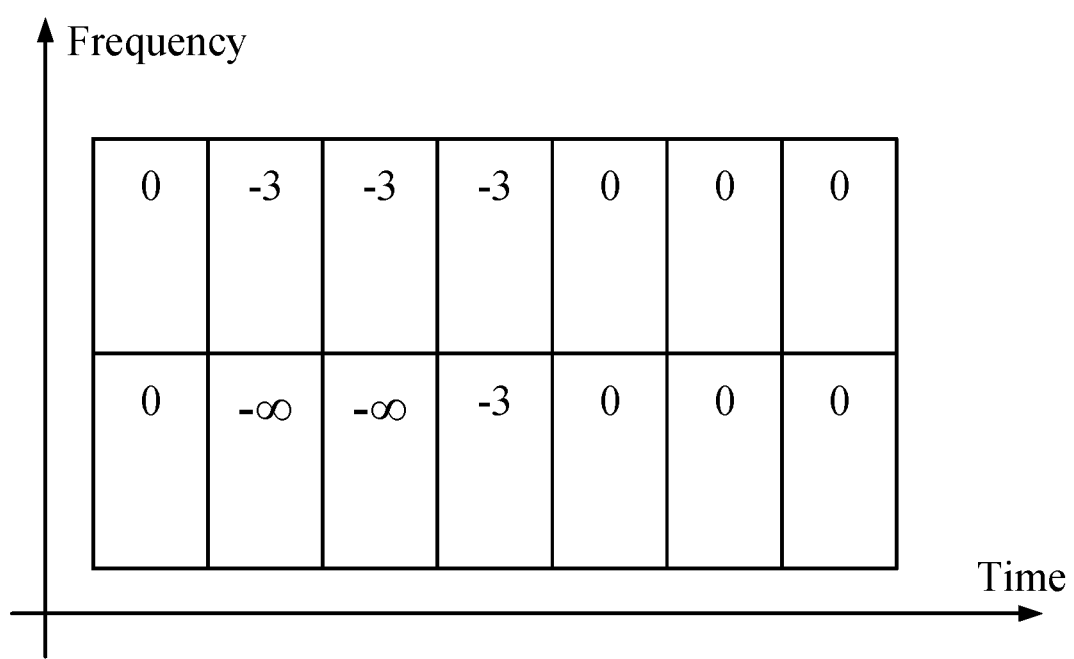
FIG. 5 is an example ULPI with a power level dimension, in accordance with certain aspects of the present disclosure.

As mentioned above, the ULPI may indicate the power level to preempt a first uplink transmission for a second uplink transmissions. In some examples, the power level indicates a power back-off. For example, as shown in FIG. 5, the ULPI may include at least 2 bits for each resource set, the values of the at least 2 bits at least indicating no back-off (e.g., 'not preempted'), a first non-zero power back-off amount (e.g., 3 dB), a second non-zero power back-off amount (e.g., 6 dB, or full power back-off (e.g., 'preempted' and the UE does not transmit on those resources). The non-zero backoff amounts may be configured by the network, for example, via radio resource control (RRC) signaling.

At 410, the UE sends or drops the one or more uplink transmissions according to the ULPI. For example, the eMBB UE may receive the ULPI via downlink signaling and suspend or reduce any transmissions scheduled during the URLLC transmissions as indicated by the ULPI. This enables the URLLCs to avoid interference with eMBB transmissions and provide an optimal wireless environment for the URLLCs.

Figure 6:
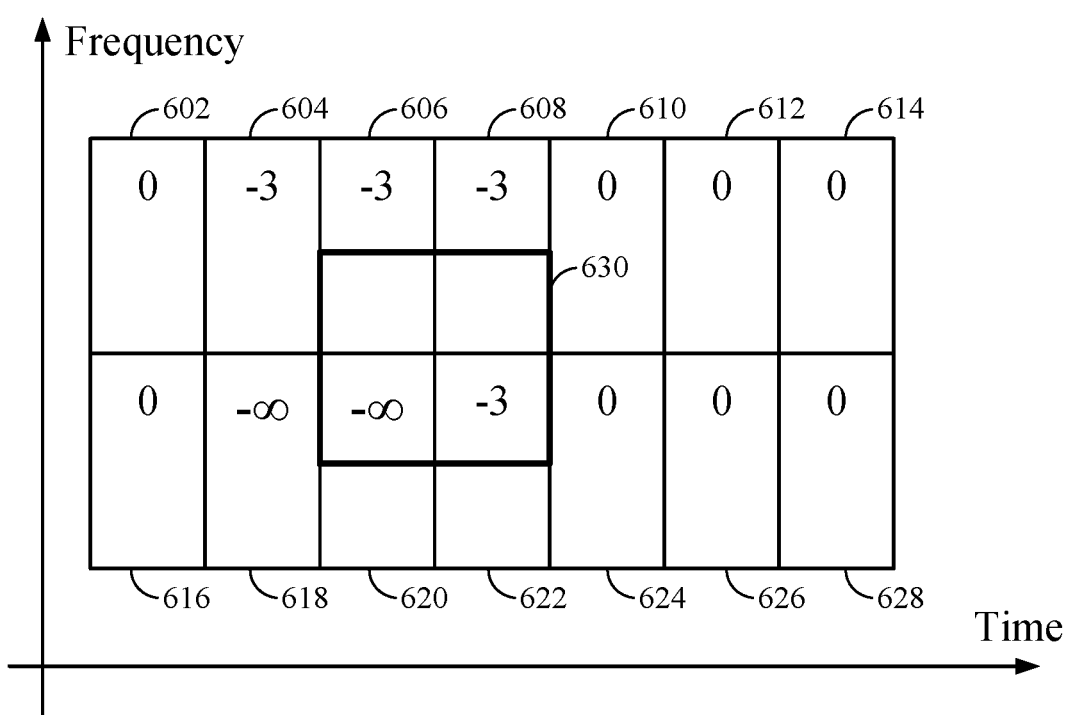
FIG. 6 is an example uplink resource allocation overlap with ULPI, in accordance with certain aspects of the present disclosure.

According to certain aspects, a UE determines one or more power levels indicated by the ULPI for resources allocated for the UE for uplink transmission. Allocated resources may include multiple sets of uplink resources. For example, as shown in FIG. 6, the ULPI provides preemption information for the resource sets 602, 604, . . . 628, and the UE uplink resource allocation 630 overlaps four of the resource sets 606, 608, 620, and 622 indicated by the ULPI. As shown in FIG. 6, the ULPI indicates 3 dB power back-off for resource sets 606, 608, and 622, and indicates preemption (full power back-off) for the resource set 620. Thus, the UE selects the power level to use for uplink transmission using the allocated resources based, at least in part, on the determination. The UE may select the power level to use based on various approaches, for example, according to a rule.

According to certain aspects, a UE can apply one or more respective power back-off indicated by the ULPI for sets of uplink resources in the uplink resource allocation (e.g., according to a first rule). For the example shown in FIG. 6, according to this rule, the UE applies the 3 dB power back-off for the RBs of the uplink resource allocation 630 included in the resource sets 606, 608, and 622, and the UE applies the full power back-off for the RBs of the uplink resource allocation 630 included in the resource set 620. As used herein, full power back-off may refer to canceling or dropping uplink transmission on the indicated resources.

According to certain aspects, the UE applies the worst case power back-off on a per symbol (e.g., OFDM symbol) basis (e.g., according to a second rule). For example, in each symbol, the UE can select the lowest power level indicted by the ULPI for the sets of uplink resources in the symbol. For example, if for a symbol k, the UE receives backoff power of −3 dB on one set of RBs, and a backoff power of −6 dB on another set of RBs, then UE may apply the backoff power −6 dB on all RBs on that symbol. For the example shown in FIG. 6, according to this rule, the UE applies the worst case, full power back-off, for the RBs of the uplink resource allocation 630 included in the resource sets 606 and 620 (which are in the same symbol(s)) and applies the worst case, 3 dB power back-off, for the RBs of the uplink resource allocation 630 included in the resource sets 608 and 622 (which are in the same symbol(s)).

According to certain aspects, the UE applies the worst case power back-off for the entire resource allocation (e.g., according to a third rule). For example, the UE selects, for all of the sets of uplink resources included in the allocated resources, a lowest power level indicated by the ULPI for those sets of uplink resources. For the example shown in FIG. 6, according to this rule, the UE applies the worst case, full power back-off (e.g., cancels or drops uplink transmission), for the all RBs of the uplink resource allocation 630 included in the resource sets 606, 608, 620, and 622.

According to certain aspects, the UE selects the rule to apply (e.g., one of the rules described above). In examples, the UE may determine the rule for selecting the power level based on a capability of the UE. For example, the UE may report its capability to apply independent power back-off on different RBs, to apply per-symbol worst case power back-off, and/or to apply worst case power back-off for all of the resource sets. In some examples, the UE may determine the rule for selecting the power level based on a transmission waveform configured for the uplink transmission. For example, the UE may use the first rule (respective power back offs), for cyclic prefix OFDM (CP-OFDM), and the UE may use the second rule (per symbol worst case power backoff) or the third rule (worst case power backoff for the entire allocation) for discrete Fourier transform spreaded OFDM (DFT-S-OFDM).

Figure 7:
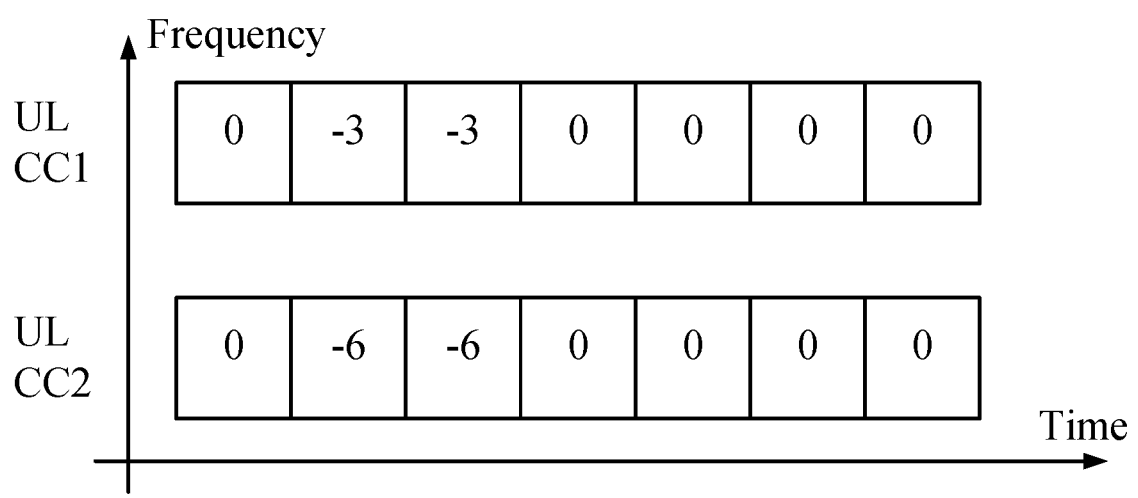
FIG. 7 is an example ULPI for multiple component carriers (CCs), in accordance with certain aspects of the present disclosure.

According to certain aspects, multiple component carriers (CCs) are configured with carrier aggregation (CA). In this case, the ULPI may contain preemption and/or power level information for one or more uplink CCs. For example, as shown in FIG. 7, the frequency domain may be divided in to two CCs (UL CC1 and UL CC2). Thus, the plurality of sets of uplink resources can include a plurality of uplink CCs and each set of resources comprises one or more uplink CCs. The rules described above for selecting the power level for the RBs of the uplink resource allocation may be used for selecting the power levels for the CCs. For example, the UE can apply the power level indicated for each set of CCs independently, the UE can apply per-symbol worst case power level, and/or worst case power level for all of the resource sets.

According to certain aspects, the UE can determine one or more rules for selecting power levels further based on whether the CCs are in a same frequency band. For example, if some CCs are in the same frequency band, the UE may apply the worst-case power-backoff/pre-emption from among those CCs in the same frequency band to those CCs. In some examples, the UE may pre-empt transmissions on all CCs in the same frequency band on the symbols indicated in ULPI, even if the ULPI indicates only pre-emption in a particular CC in the frequency band. If two CCs are not in the same frequency band, then UE may always perform independent power-backoff/pre-emption to those CCs.

Figure 8:
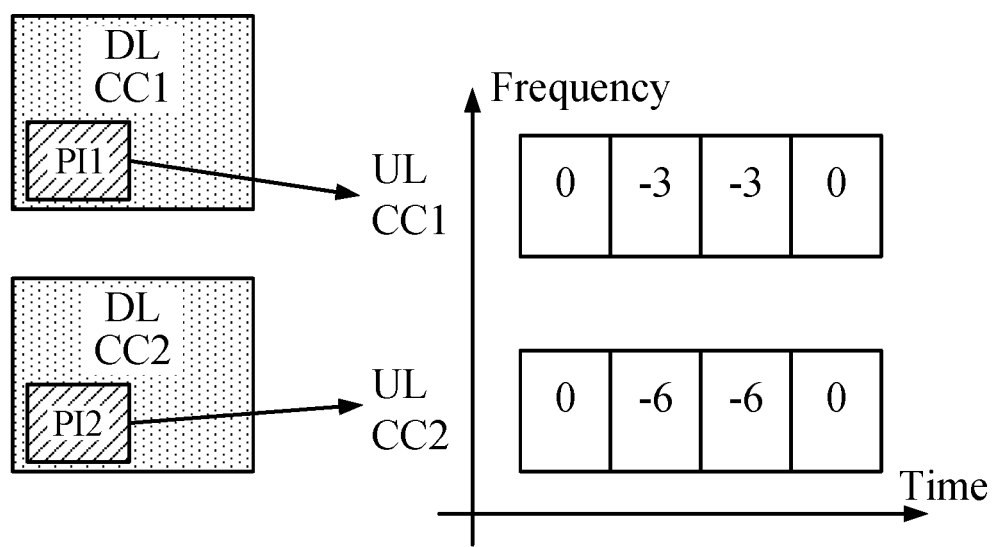
FIG. 8 is an example of per-CC ULPIs, in accordance with certain aspects of the present disclosure.
Figure 9:
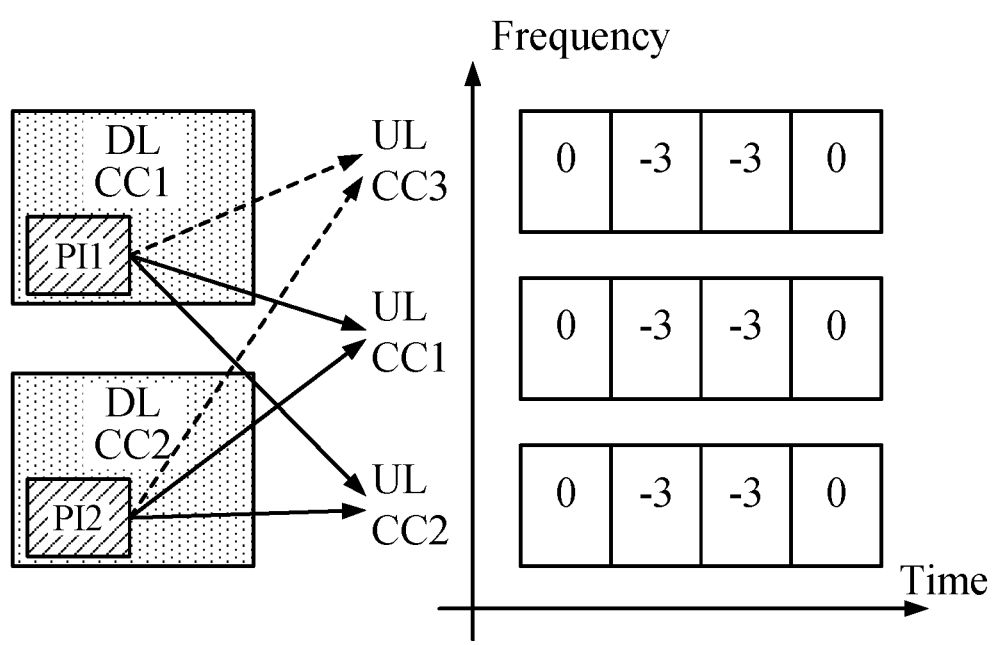
FIG. 9 is an example of ULPI for multiple CCs applied to another CC, in accordance with certain aspects of the present disclosure.

The UE may also support downlink CA. The ULPI may be sent from different downlink CCs. Thus, the UE may monitor a plurality of downlink CCs for the ULPI. According to certain aspects, a ULPI is transmitted on each DL CC with the preemption information for the corresponding UL CC. For example, in the example shown in FIG. 8, the ULPI1 is sent on DL CC1 for the UL CC1 and the ULPI2 is sent on the DL CC2 for the UL CC2. According to certain aspects, a ULPI may be transmitted on a DL CC for multiple UL CCs. Thus, the UE may apply the ULPI information for the corresponding CC(s). In some cases, the ULPI monitored on the different downlink CCs may contain preemption information for overlapping resources. For example, the UE may monitor/receive ULPI for the UL CC1 on both DL CC1 and DL CC2, as shown in FIG. 9. In this case, the UE may assume/expect that the two ULPI received on the DL CC1 and the DL CC2 indicate consistent (e.g., the same) power and/or preemption information. Multiple ULPI with the same information may improve reliability of the ULPI reception (e.g., because the same ULPI is transmitted form the BS on multiple DL CCs which provides frequency diversity). Thus, in some examples, if the information in the ULPIs conflicts, the UE may treat the information as an error case (e.g., the UE disregards the information).

According to certain aspects, even if a ULPI provides information for some uplink CCs (e.g., in FIG. 9, ULPI1 on DL CC1 and ULPI2 on DL CC2 each provide information for UL CC1 and UL CC2), if the UE has simultaneous uplink transmission on another CC (e.g., CC3 in FIG. 9), the UE may apply the power level indicated by the ULPI on the other CC (e.g., based on UE capability) as shown in FIG. 9. For example, the UE selects a power level for uplink transmission on one or more CCs not indicated by the at least one ULPI based on the power level selected for one or more CCs that are indicated by the at least one ULPI.

Figure 10:
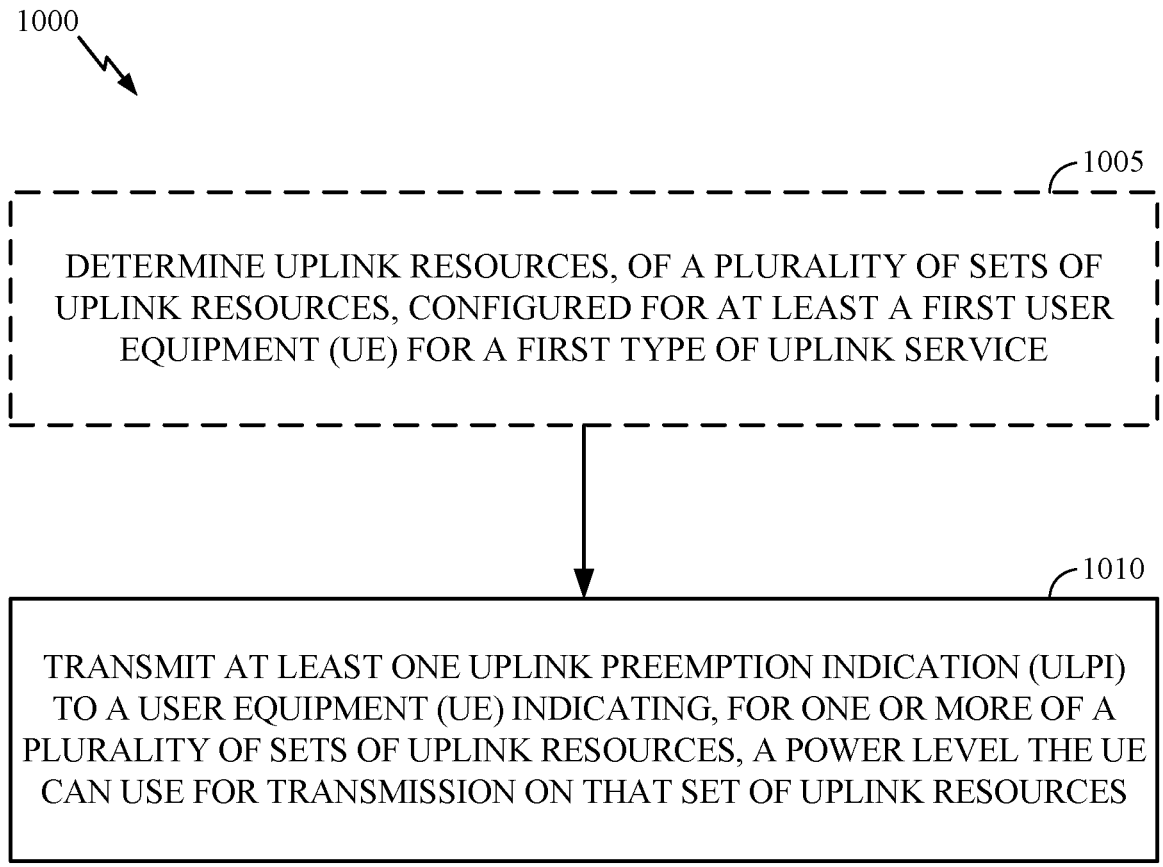
FIG. 10 is a flow diagram illustrating example operations for wireless communication by a BS, in accordance with certain aspects of the present disclosure.

FIG. 10 is a flow diagram illustrating example operations 1000 for wireless communication, in accordance with certain aspects of the present disclosure. The operations 1000 may be performed, for example, by a BS (e.g., such as the BS 110*a* in the wireless communication network 100). The operations 1000 may be complimentary operations by the BS to the operations 400 performed by the UE. Operations 1000 may be implemented as software components that are executed and run on one or more processors (e.g., processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

Optionally, at 1005, the BS may determine uplink resources, of a plurality of sets of uplink resources, configured for at least a first UE for a first type of uplink service.

At 1010, the BS transmits at least one ULPI to a UE (e.g., a second UE) indicating, for one or more of a plurality of sets of uplink resources, a power level (e.g., a backoff power level) the UE can use for transmission on that set of uplink resources (e.g., for a second type of uplink service). In some scenarios, the ULPI can indicate a power level for each of a plurality of sets of uplink resources.

In certain systems, the UE monitors PI (e.g., ULPI and/or DLPI) at a monitoring periodicity. For example, the UE may monitor every 2 slots within one PI monitoring period. In some examples, the PI indicates preemption information of the resources in 2 slots. According to certain aspects, ULPIs may point to overlapping resources. Aspects provide for which ULPI the UE should follow when the ULPIs pointing to overlapping resources provide conflicting preemption information. In some cases, the later ULPI may override the earlier ULPI only when certain conditions are met.

Figure 11:
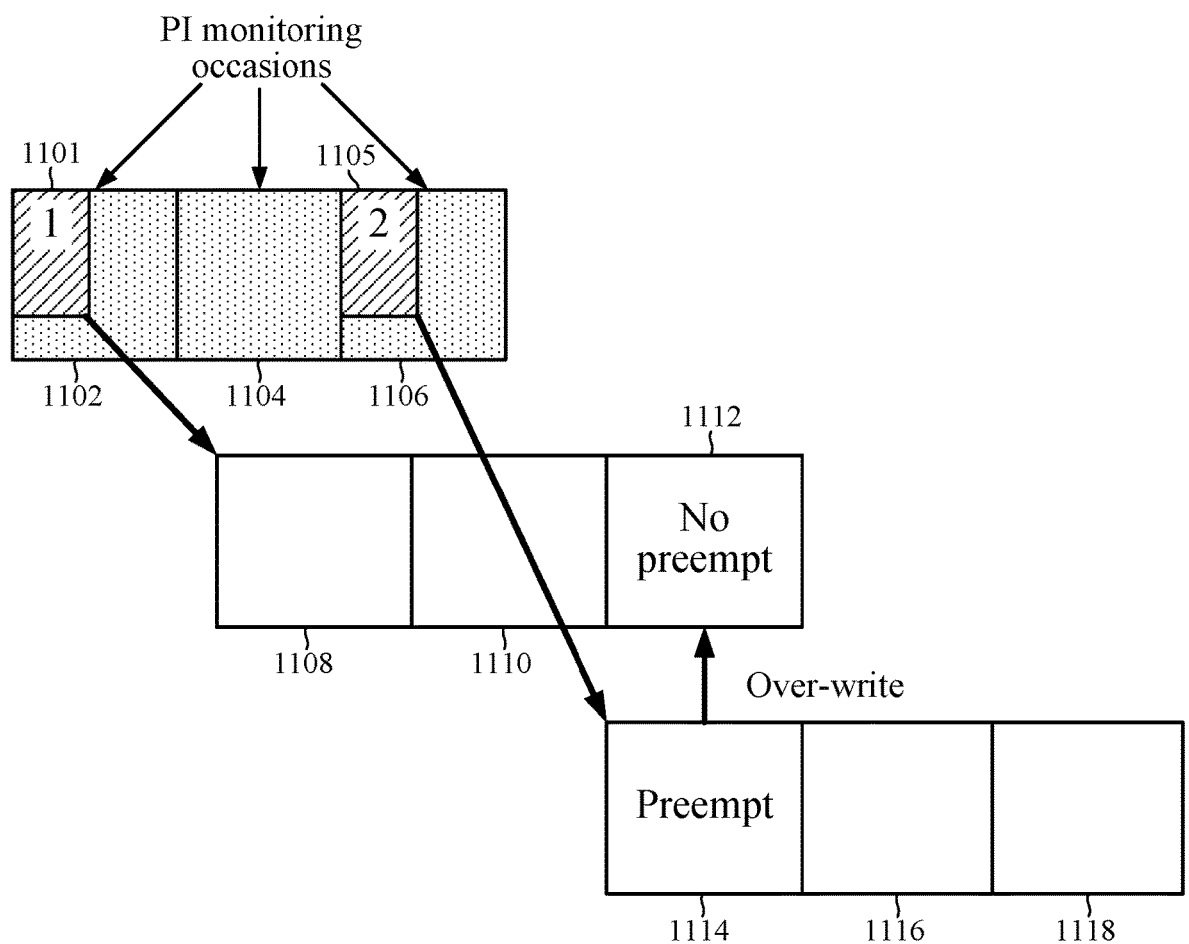
FIG. 11 is an example of ULPIs indicating overlapping resource sets, in accordance with certain aspects of the present disclosure.

In some cases, the monitoring periodicity for ULPI may be much smaller (e.g., 2 OFDM symbols), for example, to meet the stringent URLLC latency. In this case, it may be in-effective for ULPI to indicate only resources for a time duration equal to the monitoring periodicity, for example, because the ULPI may need to be padded, such that the size of the ULPI is a certain number of bits (e.g., 14 bits). Instead of adding dummy zero padding bits, the ULPI could indicate resources for a time duration equal to multiple monitoring periods as shown in FIG. 11. As shown in FIG. 11, the UE may receive a first ULPI 1101 in the monitoring period in a monitoring period 1102 and a second ULPI 1105 in a second monitoring period 1106. In this example, the preemption information does not change in the monitoring period 1104 and, thus, a third ULPI is not received during that monitoring period. The first ULPI 1101 and the second ULPI 1105 can provide preemption information on overlapping resource sets. As shown in FIG. 11, the first ULPI 1101 provides preemption information for time frequency resources 1108, 1110, and 1112 and the second ULPI 1105 provides preemption information for the time frequency resources 1114, 1116, and 1118. As shown in FIG. 11, the first ULPI 1101 indicates 'no preemption' for the time frequency resource 1112; however, the second ULPI 1105 indicates 'preemption' for the time frequency resource 1114, which overlaps the time frequency resource 1112. For example, after sending the first ULPI 1101, the BS may schedule some more urgent URLLC service in the time frequency resource 1114. Thus, as shown in FIG. 11, the ULPIs may provide conflicting information for the overlapping resources. Aspects provide techniques and apparatus for handling of conflicting ULPIs, such as for determining which ULPI to apply.

Figure 12:
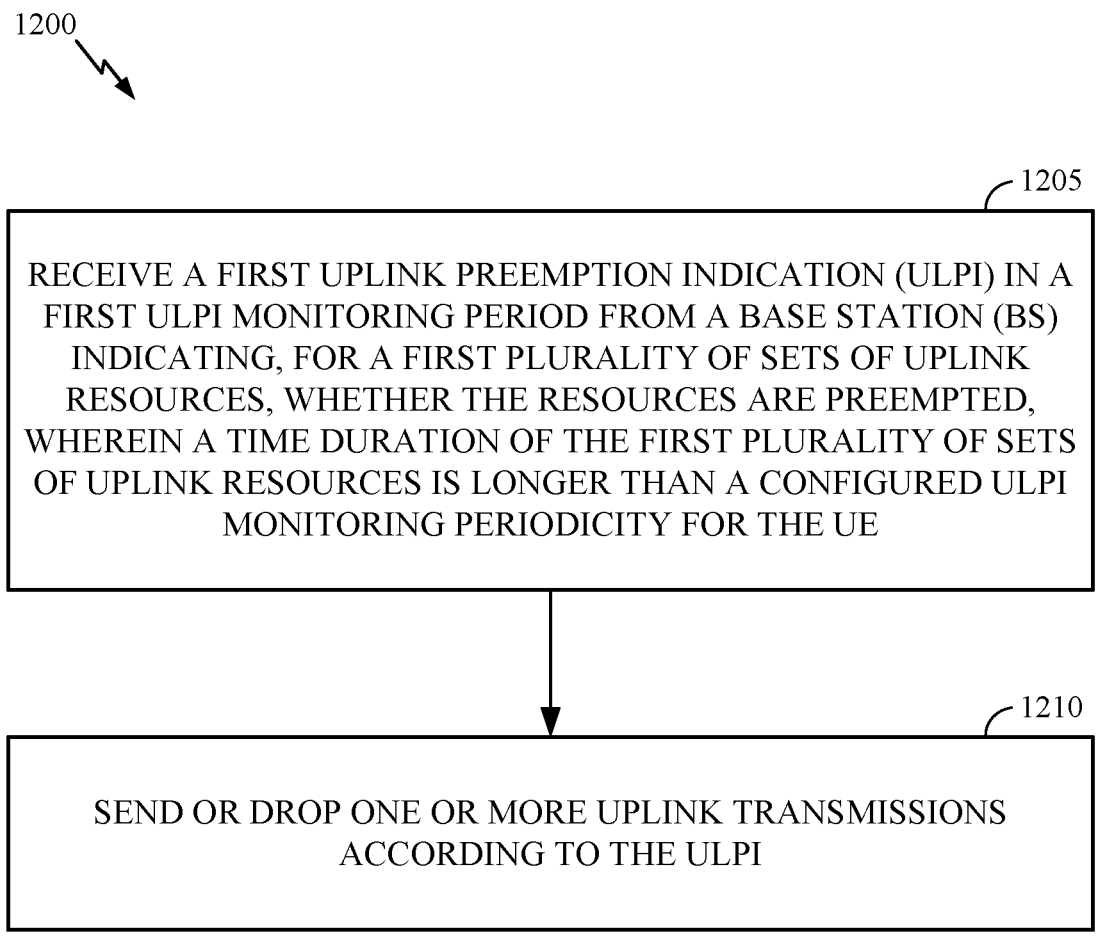
FIG. 12 is a flow diagram illustrating example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (e.g., such as the UE 120a in the wireless communication network 100). Operations 1200 may be implemented as software components that are executed and run on one or more processors (e.g., processor 280 of FIG. 2). Further, the transmission and reception of signals by the UE in operations 1200 may be enabled, for example, by one or more antennas (e.g., antennas 234 of FIG. 2). In certain aspects, the transmission and/or reception of signals by the UE may be implemented via a bus interface of one or more processors (e.g., processor 280) obtaining and/or outputting signals.

The operations 1200 may begin, at 1205 receiving a first ULPI in a first ULPI monitoring period from a BS indicating, for a first plurality of sets of uplink resources, whether the resources are preempted (e.g., eMBB preempted for URLLC). A time duration of the plurality of sets of uplink resources is longer than a configured ULPI monitoring periodicity for the UE. One or more set of resources may include a plurality of RBs in one or more symbols. The monitoring periodicity may be less than 2 slots.

At 1210, the UE sends or drops one or more uplink transmissions according to the ULPI.

According to certain aspects, the UE receives a second ULPI from the BS in a second ULPI monitoring period indicating, for a second plurality of sets of uplink resources, whether the resources are preempted. The UE determines whether the first and second plurality of sets of uplink resources overlap and, for the overlapping resources, the UE determines whether the first and second ULPIs conflict. Then, the UE determines whether to apply the first ULPI or to apply the second ULPI for the overlapping sets of uplink resources.

In some examples, the later ULPI overwrites the earlier ULPI. The UE may determine to always apply the second ULPI on overlapping uplink resources. In some examples, the overwriting may only happen in one direction. For example, if the earlier ULPI indicates 'no-preempt' for a resource set (e.g., the ULPI 1101 as shown in FIG. 11), a later ULPI indicating 'preempt' for the resource set (the ULPI 1105 as shown in FIG. 11) overwrites the earlier indication; however, a later ULPI indicating 'no-preempt' for a resource set does not overwrite an earlier ULPI indicating 'preempt' for the resource set. That is to say, in some examples, the later ULPI only overwrites the earlier ULPI when the later ULPI indicates preemption and the earlier ULPI does not indicate preemption, but a later ULPI indicating not to preempt would not override an earlier ULPI indicate to preempt. This may save DCI overhead. For example, if the eMBB transmission is much longer than the ULPI monitoring periodicity, then one ULPI could preempt multiple portions of an eMBB transmission. For example, an earlier indication of no preemption resources in a first ULPI may be overridden by a later indication of preempt for the resources in a second ULPI to schedule an urgent URLLC transmission in the resources after sending the first ULPI.

Figure 13:
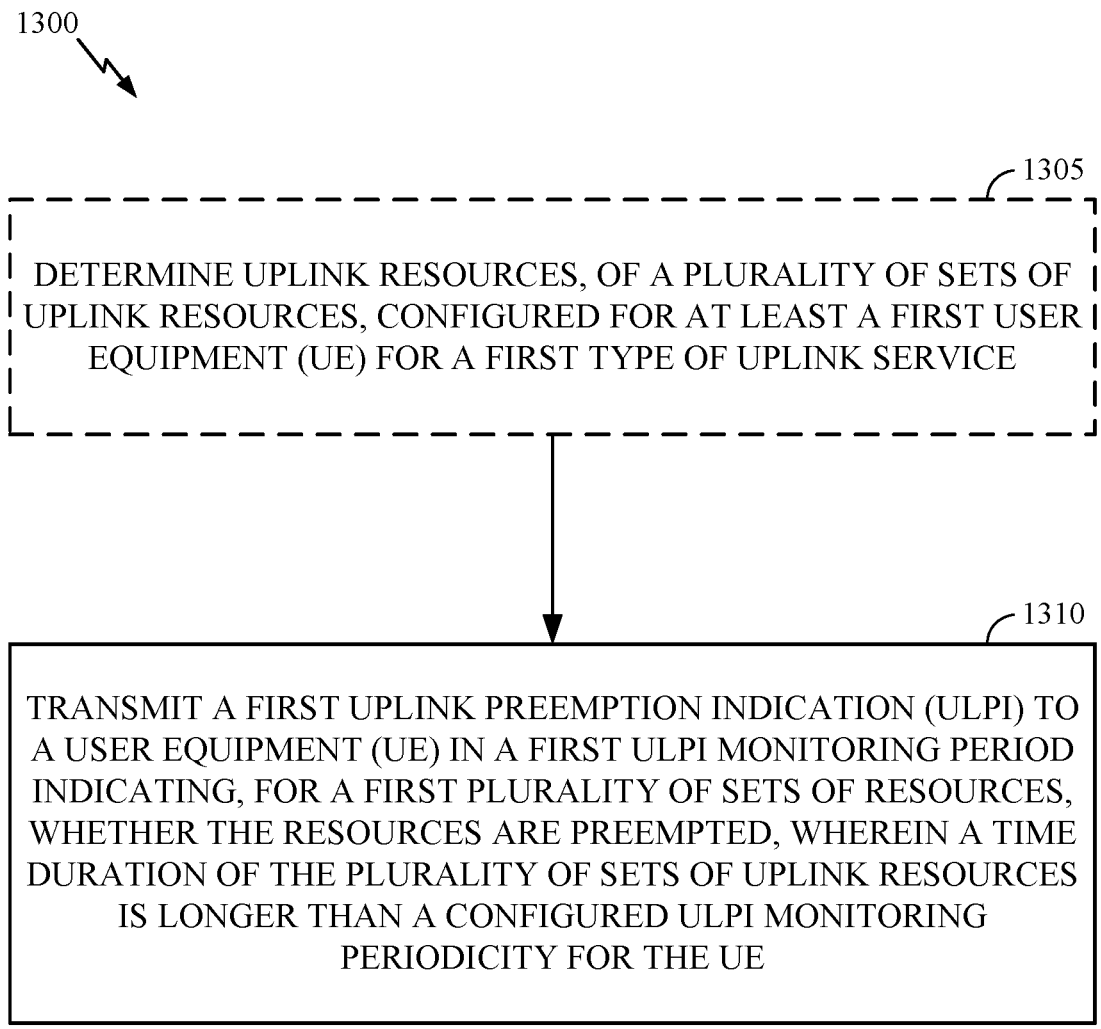
FIG. 13 is a flow diagram illustrating example operations for wireless communication by a BS, in accordance with certain aspects of the present disclosure.

FIG. 13 is a flow diagram illustrating example operations 1300 for wireless communication, in accordance with certain aspects of the present disclosure. The operations 1300 may be performed, for example, by BS (e.g., such as a BS 110a in the wireless communication network 100). The operations 1300 may be complimentary operations by the BS to the operations 1300 performed by the UE.

Optionally, at 1305, the BS may determine uplink resources, of a plurality of sets of uplink resources, configured for at least a first UE for a first type of uplink service. At 1310, the BS transmits a first ULPI to a UE in a first ULPI monitoring period indicating, for a first plurality of sets of uplink resources, whether the resources are preempted. A time duration of the plurality of sets of uplink resources is longer than a configured ULPI monitoring periodicity for the UE.

Techniques described herein provide advantages to URLLC systems. To improve the latency and reliability of URLLC systems, the RAN may signal to one or more UEs, via the ULPI, to suspend transmissions or reduce the transmit power of transmissions during scheduled URLLC transmissions. This may reduce the interference encountered at the BS and enhance the signal to noise ratio of URLLC signals. Also, cross-carrier information enables the RAN to service more than one CC, reducing the signaling overhead to preempt resources as described herein.

Figure 14:
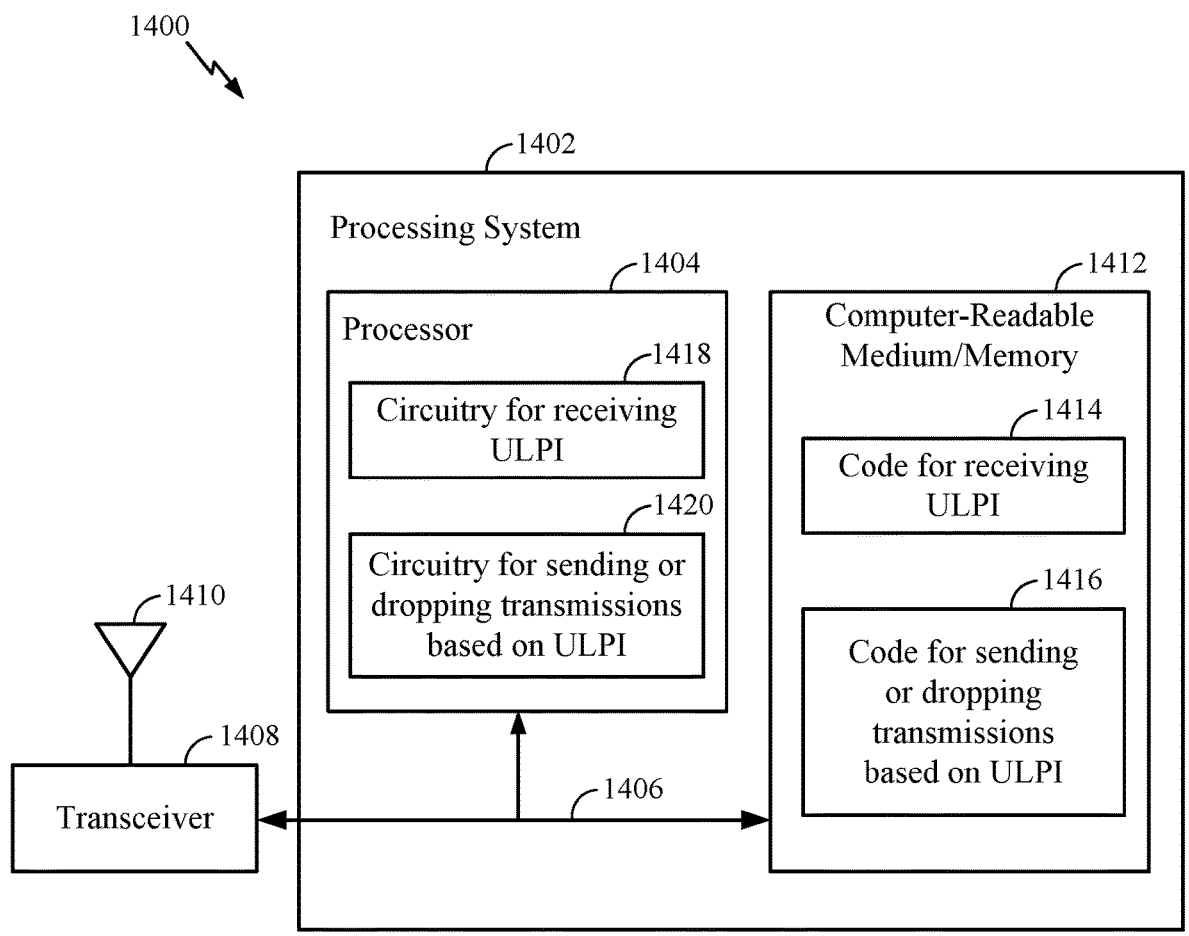
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 4 and/or FIG. 12. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 4 and/or FIG. 12, or other operations for performing the various techniques discussed herein for ULPI. In certain aspects, computer-readable medium/memory 1412 stores code 1414 for receiving ULPI; and code 1416 for sending or dropping uplink transmissions based on the ULPI, in accordance with aspects of the disclosure. In certain aspects, the processor 1404 has circuitry configured to implement the code stored in the computer-readable medium/memory 1412. The processor 1404 includes circuitry 1418 for receiving ULPI; and circuitry 1420 for sending or dropping uplink transmissions based on the ULPI, in accordance with aspects of the disclosure.

Figure 15:
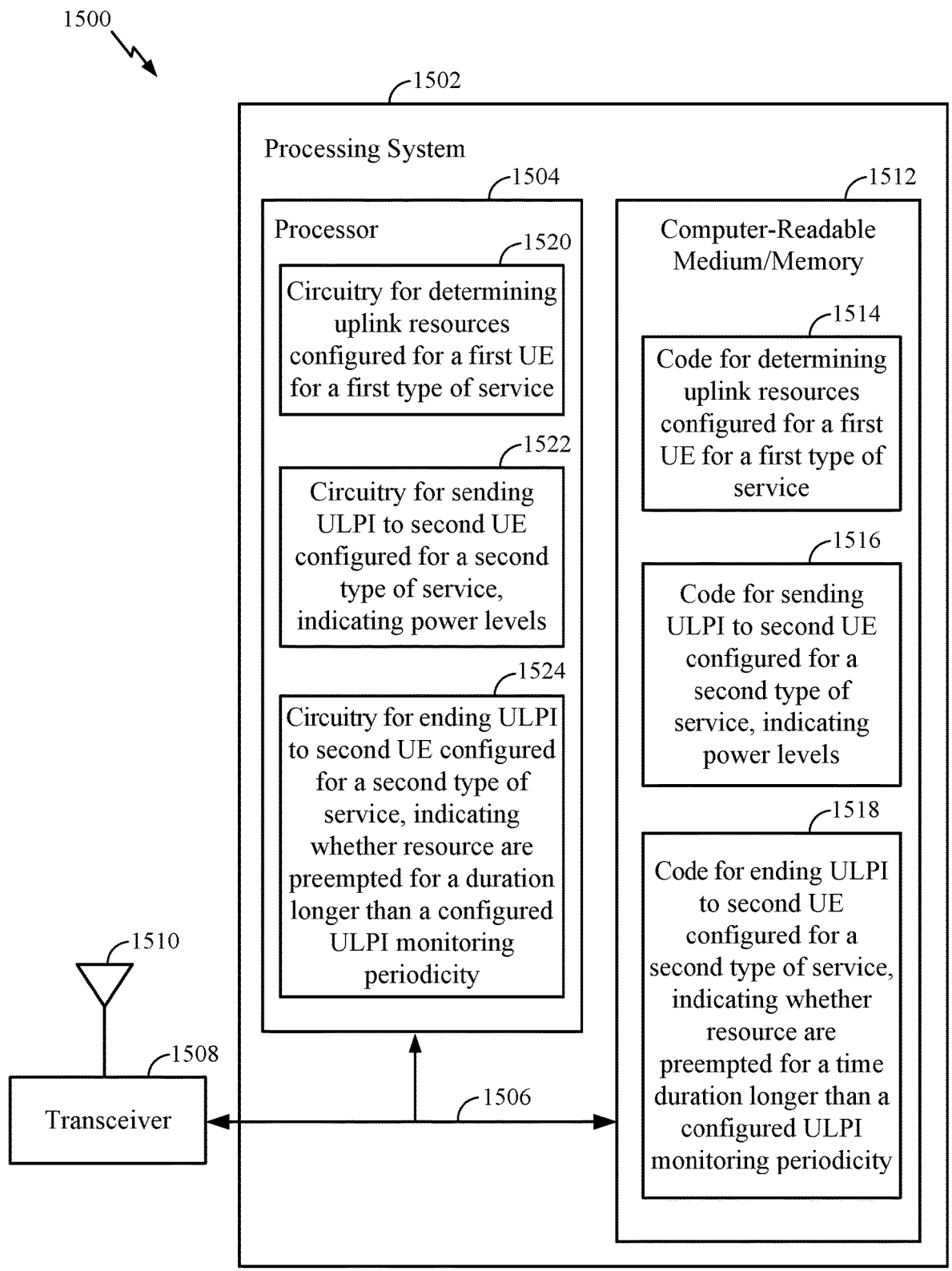
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 10 and/or FIG. 13. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 10 and/or FIG. 13, or other operations for performing the various techniques discussed herein for ULPI. In certain aspects, computer-readable medium/memory 1512 stores code 1514 for determining uplink resources configured for a first UE for a first type of service; code 1516 for sending ULPI to second UE configured for a second type of service, indicating power levels; and code 1518 for sending ULPI to second UE configured for a second type of service, indicating whether resource are preempted for a duration longer than a configured ULPI monitoring periodicity, in accordance with aspects of the disclosure. In certain aspects, the processor 1504 has circuitry configured to implement the code stored in the computer-readable medium/memory 1512. The processor 1504 includes circuitry 1520 for determining uplink resources configured for a first UE for a first type of service; circuitry 1522 for sending ULPI to second UE configured for a second type of service, indicating power levels; and circuitry 1524 for sending ULPI to second UE configured for a second type of service, indicating whether resource are preempted for a duration longer than a configured ULPI monitoring periodicity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 4, FIG. 10, FIG. 12, and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving at least one uplink preemption indication (ULPI) from a base station (BS) indicating, for a plurality of sets of uplink resources, a transmit power level for the UE, wherein the ULPI indicates different power levels for at least two sets of uplink resources of the plurality of sets of uplink resources;
   determining a resource allocation for an uplink transmission, wherein the resource allocation allocates multiple sets of uplink resources including the at least two sets of uplink resources; and
   sending or dropping the uplink transmission according to the ULPI based on a rule, including:
      selecting a lowest power level indicated by the ULPI for sets of uplink resources, of the multiple sets of uplink resources, within a same symbol; or
      selecting a lowest power level indicated by the ULPI for at least one of the multiple sets of uplink resources.

2. The method of claim 1, further comprising determining the rule based on at least one of: a transmission waveform configured for the uplink transmission or a capability of the UE.

3. The method of claim 1, wherein:
   each set of uplink resources comprises one or more uplink component carriers (CCs).

4. The method of claim 3, further comprising determining the rule based on whether the CCs are in a same frequency band.

5. The method of claim 1, wherein each set of uplink resources comprises a plurality of resource blocks (RBs) in one or more symbols.

6. The method of claim 1, wherein the indication of the power level comprises a power back off value for each set of uplink resources.

7. The method of claim 6, wherein:
   the ULPI comprises at least 2 bits for each set of uplink resources; and
   values of the at least 2 bits at least indicate one of no power back-off, a first non-zero power back-off value, a second non-zero power back-off value, or full power back-off, full power-back off indicating the set of uplink resources is preempted and the UE does not transmit on the set of uplink resources.

8. The method of claim 7, further comprising receiving radio resource control (RRC) signaling configuring the first non-zero power back-off value and the second non-zero power back-off value.

9. The method of claim 1, further comprising monitoring a plurality of downlink component carriers (CCs) for the ULPI.

10. The method of claim 9, wherein:
    the at least one ULPI comprises a plurality of ULPIs received on each of the plurality of downlink CCs; and
    the ULPI received on each downlink CC indicates the power level for a plurality of sets of uplink resources for a same set of uplink CCs or a different set of uplink CCs.

11. The method of claim 10, further comprising disregarding UPLIs of the plurality of ULPIs that indicate different power levels for a same set of uplink resources.

12. The method of claim 10, further comprising selecting a power level for uplink transmission on one or more CCs not indicated by the at least one ULPI based on the power level selected for one or more CCs that are indicated by the at least one ULPI.

13. A method for wireless communication by a base station (BS), comprising:
transmitting at least one uplink preemption indication (ULPI) to a user equipment (UE) indicating, for a plurality of sets of uplink resources, a power level for the UE, wherein the ULPI indicates different power levels for at least two sets of uplink resources of the plurality of sets of uplink resources;
providing a resource allocation to the UE for an uplink transmission, wherein the resource allocation allocates multiple sets of uplink resources including the at least two sets of uplink resources; and
receiving the uplink transmission from the UE, wherein the uplink transmission uses:
a lowest power level indicated by the ULPI for sets of uplink resources, of the multiple sets of uplink resources, within a same symbol; or
a lowest power level indicated by the ULPI for at least one of the multiple sets of uplink resources.

14. The method of claim 13, wherein the indication of the power level comprises a power back off value for each set of uplink resources.

15. The method of claim 14, wherein:
the ULPI comprises at least 2 bits for each set of uplink resources; and
values of the at least 2 bits at least indicate one of no power back-off, a first non-zero power back-off value, a second non-zero power back-off value, or full power back-off, full power-back off indicating the set of uplink resources is preempted and the UE does not transmit on the set of uplink resources.

16. The method of claim 13, wherein:
each set of uplink resources comprises one or more uplink component carriers (CCs).

17. The method of claim 16, wherein:
the at least one ULPI comprises a plurality of ULPIs transmitted on a plurality of downlink CCs; and
the ULPI transmitted on each downlink CC indicates the power level for a plurality of sets of uplink resources for a same set of uplink CCs or a different set of uplink CCs.

18. An apparatus for wireless communications, comprising:
a memory; and
at least one processor operatively coupled to the memory and configured to:
receive at least one uplink preemption indication (ULPI) from a base station (BS) indicating, for a plurality of sets of uplink resources, a transmit power level for the apparatus, wherein the ULPI indicates different power levels for at least two sets of uplink resources of the plurality of sets of uplink resources;
determine a resource allocation for an uplink transmission, wherein the resource allocation allocates multiple sets of uplink resources including the at least two sets of uplink resources; and
send or drop the uplink transmission according to the ULPI, the sending or dropping including selecting a power level to use for the uplink transmission based on a rule, wherein the rule includes:
selecting a lowest power level indicated by the ULPI for sets of uplink resources, of the multiple sets of uplink resources, within a same symbol; or
selecting a lowest power level indicated by the ULPI for at least one of the multiple sets of uplink resources.

19. The apparatus of claim 18, wherein the at least one processor is further configured to determine the rule based on at least one of: a transmission waveform configured for the uplink transmission or a capability of the apparatus.

20. The apparatus of claim 18, wherein each set of uplink resources comprises one or more uplink component carriers (CCs).

21. The apparatus of claim 20, wherein the at least one processor is further configured to determine the rule based on whether the CCs are in a same frequency band.

22. The apparatus of claim 18, wherein each set of uplink resources comprises a plurality of resource blocks (RBs) in one or more symbols.

23. The apparatus of claim 18, wherein the indication of the power level comprises a power back off value for each set of uplink resources.

24. The apparatus of claim 23, wherein:
the ULPI comprises at least 2 bits for each set of uplink resources; and
values of the at least 2 bits at least indicate one of no power back-off, a first non-zero power back-off value, a second non-zero power back-off value, or full power back-off, full power-back off indicating the set of uplink resources is preempted and the apparatus does not transmit on the set of uplink resources.

25. The apparatus of claim 24, wherein the at least one processor is further configured to receive radio resource control (RRC) signaling configuring the first non-zero power back-off value and the second non-zero power back-off value.

26. An apparatus for wireless communications, comprising:
a memory; and
at least one processor operatively coupled to the memory and configured to:
transmit at least one uplink preemption indication (ULPI) to a user equipment (UE) indicating, for a plurality of sets of uplink resources, a power level for the apparatus, wherein the ULPI indicates different power levels for at least two sets of uplink resources of the plurality of sets of uplink resources;
provide a resource allocation to the UE for an uplink transmission, wherein the resource allocation allocates multiple sets of uplink resources including the at least two sets of uplink resources; and
receive the uplink transmission from the UE, wherein the uplink transmission uses a lowest power level indicated by the ULPI for sets of uplink resources, of the multiple sets of uplink resources, within a same symbol or a lowest power level indicated by the ULPI for at least one of the multiple sets of uplink resources.

27. The apparatus of claim 26, wherein the indication of the power level comprises a power back off value for each set of uplink resources.

28. The apparatus of claim 27, wherein:
the ULPI comprises at least 2 bits for each set of uplink resources; and
values of the at least 2 bits at least indicate one of no power back-off, a first non-zero power back-off value, a second non-zero power back-off value, or full power back-off, full power-back off indicating the set of uplink resources is preempted and the UE does not transmit on the set of uplink resources.

29. The apparatus of claim 26, wherein each set of uplink resources comprises one or more uplink component carriers (CCs).

30. The apparatus of claim 29, wherein:
- the at least one ULPI comprises a plurality of ULPIs transmitted on a plurality of downlink CCs; and
- the ULPI transmitted on each downlink CC indicates the power level for a plurality of sets of uplink resources for a same set of uplinks CCs or a different set of uplink CCs.

* * * * *